US005964818A

United States Patent [19]

Kanehara et al.

[11] Patent Number: 5,964,818

[45] Date of Patent: Oct. 12, 1999

[54] PROCESS FOR PRESUMING POWER-TRANSMITTED STATE IN METAL BELT-TYPE CONTINUOUSLY VARIABLE TRANSMISSION, AND PROCESS FOR CONTROLLING AXIAL THRUST IN METAL BELT-TYPE CONTINUOUSLY VARIABLE TRANSMISSION

[75] Inventors: Shigeru Kanehara; Kenichi Namerikawa, both of Wako, Japan

[73] Assignee: Honda Giken Kogyo Kabushiki Kaisha, Tokyo, Japan

[21] Appl. No.: 08/923,332

[22] Filed: Sep. 4, 1997

[30] Foreign Application Priority Data

Sep. 10, 1996 [JP] Japan .................................... 8-239256

[51] Int. Cl.[6] ........................................................ F16H 9/00

[52] U.S. Cl. .................................. 701/51; 701/66; 474/8; 477/37

[58] Field of Search ................................. 701/51, 53, 66; 474/8, 11, 17; 477/37, 44

[56] References Cited

U.S. PATENT DOCUMENTS 5,766,105 6/1998 Fellows et al. ........................... 474/18

FOREIGN PATENT DOCUMENTS 6-117530 4/1994 Japan .

*Primary Examiner*—Tan Nguyen

*Attorney, Agent, or Firm*—Nikaido, Marmelstein, Murray & Oram LLP

[57] ABSTRACT

A process for presuming a power-transmitted state in a metal belt-type continuously variable transmission and for controlling axial thrust in a metal belt-type continuously variable transmission wherein it is presumed that a vector sum of friction coefficients $\mu_{TDN}$ and $\mu_{RDN}$ of a driven pulley is 0.1; a friction coefficient $\mu_{RDR}$ of a drive pulley is 0, and a friction coefficient $\mu_{SDR}$ or $\mu_{SDN}$ of the one of the pulleys which has a smaller winding radius is 0.1. A speed ratio i, a number $N_{IN}$ of rotations of the drive pulley, an input torque $T_{IN}$ to the drive pulley and an axial thrust $Q_{DN}$ of the driven pulley are measured, and the measured values are introduced into relational equations of the balance of forces on various portions of a metal belt-type continuously variable transmission. In this manner, an axial thrust $Q_{DR}$ of the drive pulley, urging forces $E_1$ and $E_2$ between the blocks and the pulleys, an axis-axis force FS, ring tensions $T_1$ and $T_2$, a friction coefficient $\mu_{TDR}$, a friction coefficient $\mu_{TDN}$, a friction coefficient $\mu_{RDN}$, and a friction coefficient $\mu_{SDR}$ or $\mu_{SDN}$ of the one of the pulleys which has a larger winding diameter can be calculated from the relational equations. Thus, a power-transmitted state such as the friction coefficient can be presumed without actual generation of a slipping between a metal belt and a pulley of the metal belt-type continuously variable transmission.

5 Claims, 12 Drawing Sheets

HYDRAULIC CONTROL UNIT U2

ELECTRONIC CONTROL UNIT U1

DN PULLEY (THRUST: $Q_{DN}$)

DR PULLEY (THRUST: $Q_{DR}$)

DN PULLEY
(THRUST;$Q_{DN}$)
DR PULLEY
(THRUST;$Q_{DR}$)
$\mu_{SDN}$
$\mu_{RDN}$
$\mu_{TDN}$
FS
$\beta$
$\theta_{DN}$
E1
E2
T1
T2
$R_{DR}$
$\mu_{RDR}$
$\theta_{DR}$
$\mu_{TDR}$
$\mu_{SDR}$ DN PULLEY
$\mu_S P(\beta)d\beta$
$E(\beta)+dE$
$E(\beta)$
$2\mu_T N(\beta)d\beta$
$d\beta$ DR PULLEY
$\mu_S P(\beta)d\beta$
$E(\beta)+dE$
$E(\beta)$
$2\mu_T N(\beta)d\beta$
$d\beta$ DN PULLEY
T(β)+dT
μSP(β)dβ
dβ
T(β)

DR PULLEY
T(β)
μSP(β)dβ
dβ
T(β)+dT

DN PULLEY
T(β)+dT
P(β)dβ
T(β)
dβ

DR PULLEY
T(β)
P(β)dβ
T(β)+dT
dβ

DN PULLEY
DR PULLEY
T2
T2
T1
T1
$\theta_{DN}$
$\theta_{DR}$
$\beta^*$
$\beta e$
$\beta^*$
$\beta e$

PROCESS FOR PRESUMING POWER-TRANSMITTED STATE IN METAL BELT-TYPE CONTINUOUSLY VARIABLE TRANSMISSION, AND PROCESS FOR CONTROLLING AXIAL THRUST IN METAL BELT-TYPE CONTINUOUSLY VARIABLE TRANSMISSION

BACKGROUND OF THE INVENTION

1. Field of the Invention

The present invention relates to a metal belt-type continuously variable transmission including a metal belt reeved around a drive pulley and a driven pulley, and more particularly, to a process for presuming a power-transmitted state in such a metal belt-type continuously variable transmission and a process for controlling the axial thrust using such process.

2. Description of the Related Art

To determine a friction coefficient $\mu$ between a pulley and a block in a metal belt-type continuously variable transmission, conventionally, as described in Japanese Patent Application Laid-open No. 6-117530, for example, the axial thrusts of a drive pulley and a driven pulley are gradually decreased while operating the transmission at a given speed ratio, and the friction coefficient $\mu$ is calculated according to the following equation based on the axial thrust at a moment when slipping is generated between a metal belt and the pulley:

$$Q=T \cos \alpha/2\mu R$$

wherein Q is the axial thrust of a pulley which has slipped; T is the torque of the pulley which has slipped; R is the pitch radius of the pulley which has slipped; and $\alpha$ is the inclination angle of the V-bevel face of the pulley.

If an attempt is made to determine the friction coefficient $\mu$ using the conventional method, it is necessary to produce slipping between the metal belt and the pulley at a predetermined relative speed, and the following problem is encountered: it is difficult to control the axial thrust of the pulley, so that the slip amount does not exceed a predetermined value. In many cases, the slip amount is abruptly increased at the moment when slipping is generated, whereby the metal belt and the pulley are fused, resulting in a non-normal friction coefficient, and the metal belt or the like is broken.

SUMMARY OF THE INVENTION

Accordingly, it is an object of the present invention to presume a power-transmitted state of a metal belt-type continuously variable transmission including presuming a friction coefficient between the metal belt and the pulley without generation of slipping between the metal belt and the pulley, and to prevent slipping and wearing of the metal belt based on the presumed friction coefficient.

To achieve the above object, according to a first aspect and feature of the present invention, there is provided a process for presuming a power-transmitted state in a metal belt-type continuously variable transmission in which a metal belt comprising a large number of blocks supported on rings, is reeved around a drive pulley and a driven pulley, so that a shift ratio is controlled by changing groove widths of both the pulleys using hydraulic pressure. The process comprises the steps of forming relational equations indicating relationships among the speed ratio between the drive and driven pulleys, the number of rotations of the drive pulley, the input torque to the drive pulley, the axial thrust of the drive pulley, the axial thrust of the driven pulley, either one of the urging force between the blocks at the outlet of the drive pulley or the urging force between the blocks at the inlet of the drive pulley, the axis-axis force between the drive pulley and the driven pulley, the tension of the ring at the outlet of the drive pulley, the tension of the ring at the inlet of the drive pulley, the radial component of the friction coefficient between the pulley and the block of the drive pulley, the tangent component of the friction coefficient between the pulley and the block of the driven pulley, and the radial component of the friction coefficient between the pulley and the block of the driven pulley. The radial component of the friction coefficient between the pulley and the block of the drive pulley is introduced into the relational equations on the assumption that it is a predetermined value, and a vector sum of the tangent and radial components of the friction coefficient between the pulley and the block of the driven pulley is introduced into the relational equations on the assumption that it is a predetermined value. The speed ratio between the drive pulley and the driven pulley, the number of rotations of the drive pulley, the input torque to the drive pulley and the axial thrust of the driven pulley are all measured to introduce them into the relational equations. The axial thrust of the drive pulley is calculated from the relational equations.

With the above feature, the axial thrust of the drive pulley can be calculated without actually being measured. The calculation can be made by measuring only the four values of the speed ratio between the drive and driven pulleys, the number of rotations of the drive pulley, the input torque to the drive pulley and the axial thrust of the driven pulley. Therefore, it is possible to easily and accurately determine the power-transmitted state of the metal belt-type continuous transmission.

To achieve the above object, according to a second aspect and feature of the present invention, there is provided a process for presuming a power-transmitted state in a metal belt-type continuously variable transmission in which a metal belt comprises a large number of blocks supported on rings, is reeved around a drive pulley and a driven pulley, so that a shift ratio is controlled by changing groove widths of both the pulleys using hydraulic pressure. The process comprises the steps of forming relational equations indicating relationships among the speed ratio between the drive and driven pulleys, the number of rotations of the drive pulley, the input torque to the drive pulley, the axial thrust of the drive pulley, the axial thrust of the driven pulley, either one of the urging force between the blocks at the outlet of the drive pulley or the urging force between the blocks at the inlet of the drive pulley, the axis-axis force between the drive pulley and the driven pulley, the tension of the ring at the outlet of the drive pulley, the tension of the ring at the inlet of the drive pulley, the tangent component of the friction coefficient between the ring and the block of the drive pulley, and the tangent component of the friction coefficient between the ring and the block of the driven pulley. The tangent component of the friction coefficient between the ring and the block of the one of the drive pulley and the driven pulley which has a smaller winding diameter is introduced into the relational equations on the assumption that it is a predetermined value. The speed ratio between the drive pulley and the driven pulley, the number of rotations of the drive pulley, the input torque to the drive pulley and the axial thrust of the driven pulley are measured to place them into the relational equations, thereby calculating the tension of the ring at the outlet of the drive pulley, the tension of the ring at the inlet of the drive pulley and either one of the urging force between the blocks at the outlet of the drive pulley or the urging force between the blocks at the inlet of the drive pulley from the relational equations.

With the above feature, the tension of the ring at the outlet of the drive pulley, the tension of the ring at the inlet of the drive pulley and either one of the urging force between the blocks at the outlet of the drive pulley or the urging force between the blocks at the inlet of the drive pulley can be calculated without being actually measured, but rather by measuring only the four values of the speed ratio between the drive and driven pulleys, the number of rotations of the drive pulley, the input torque to the drive pulley and the axial thrust of the driven pulley. Therefore, it is possible to easily and accurately determine the power-transmitted state of the metal belt-type continuous transmission.

To achieve the above object, according to a third aspect and feature of the present invention, there is provided a process for presuming a power-transmitted state in a metal belt-type continuously variable transmission in which a metal belt comprising a large number of blocks supported on rings is reeved around a drive pulley and a driven pulley, so that a shift ratio is controlled by changing groove widths of both the pulleys using hydraulic pressure. The process comprises the steps of forming relational equations indicating relationships among the speed ratio between the drive and driven pulleys, the number of rotations of the drive pulley, the input torque to the drive pulley, the axial thrust of the drive pulley, the axial thrust of the driven pulley, either one of the urging force between the blocks at an outlet of the drive pulley or the urging force between the blocks at an inlet of the drive pulley, the axis-axis force between the drive pulley and the driven pulley, the tension of the ring at the outlet of the drive pulley, the tension of the ring at the inlet of the drive pulley, the tangent component of the friction coefficient between the pulley and the block of the drive pulley, the tangent component of the friction coefficient between the pulley and the block of the driven pulley, the radial component of the friction coefficient between the pulley and the block of the drive pulley, the radial component of the friction coefficient between the pulley and the block of the driven pulley, the tangent component of the friction coefficient between the ring and the block of the drive pulley, and the tangent component of the friction coefficient between the ring and the block of the driven pulley. The tangent component of the friction coefficient between the ring and the block of one of the drive pulley and the driven pulley, which has a smaller winding diameter is introduced into the relational equations on the assumption that it is a predetermined value. The speed ratio between the drive pulley and the driven pulley, the number of rotations of the drive pulley, the input torque to the drive pulley, the axial thrust of the drive pulley, the axial thrust of the driven pulley and the axis-axis force between the drive and driven pulleys are measured and also introduced into the relational equations, thereby calculating either one of the urging force between the blocks at the outlet of the drive pulley or the urging force between the blocks at the inlet of the drive pulley, the tension of the ring at the outlet and the inlet of the drive pulley, the tangent and radial components of the friction coefficient between the pulley and the block of the drive pulley, the tangent and radial components of the friction coefficient between the pulley and the block of the driven pulley, and the tangent component of the friction coefficient between the ring and the block of the one of the drive pulley and driven pulley, which has a larger winding diameter from the relational equations.

With the above feature, either one of the urging force of the block at the outlet of the drive pulley or the urging force of the block at the inlet of the drive pulley, the tension of the ring at the outlet of the drive pulley, the tension of the ring at the inlet of the drive pulley, the tangent and radial components of the friction coefficient between the pulley and the block of the drive pulley, the tangent and radial components of the friction coefficient between the pulley and the block of the driven pulley, and the tangent component of the friction coefficient between the ring and the block of the one of the drive and driven pulleys which has a larger winding diameter can be calculated without being actually measured by measuring only the six values of the speed ratio between the drive and driven pulleys, the number of rotations of the drive pulley, the input torque to the drive pulley, the axial thrust of the drive pulley, the axial thrust of the driven pulley and the axis-axis force between the drive and driven pulleys. Thus, it is possible to easily and accurately grasp the power-transmitted state of the metal belt-type continuous transmission.

To achieve the above object, according to a fourth aspect and feature of the present invention, there is provided a process for presuming a power-transmitted state in a metal belt-type continuously variable transmission in which a metal belt comprising a large number of blocks supported on rings, is reeved around a drive pulley and a driven pulley, so that a shift ratio is controlled by changing groove widths of both the pulleys using hydraulic pressure. The process comprises the steps of forming relational equations indicating relationships among the speed ratio between the drive and driven pulleys, the number of rotations of the drive pulley, the input torque to the drive pulley, the axial thrust of the drive pulley, the axial thrust of the driven pulley, either one of the urging force between the blocks at an outlet of the drive pulley or the urging force between the blocks at an inlet of the drive pulley, the axis-axis force between the drive pulley and the driven pulley, the tension of the ring at the outlet of the drive pulley, the tension of the ring at the inlet of the drive pulley, the tangent component of the friction coefficient between the pulley and the block of the drive pulley, the tangent component of the friction coefficient between the pulley and the block of the driven pulley, the radial component of the friction coefficient between the pulley and the block of the drive pulley, the radial component of the friction coefficient between the pulley and the block of the driven pulley, the tangent component of the friction coefficient between the ring and the block of the drive pulley, and the tangent component of the friction coefficient between the ring and the block of the driven pulley. The radial component of the friction coefficient between the pulley and the block of the drive pulley is introduced into the relational equations on the assumption that it is a predetermined value; a vector sum of the tangent and radial components of the friction coefficient between the pulley and the block of the driven pulley is introduced into the relational equations on the assumption that it is a predetermined value; and the tangent component of the friction coefficient between the ring and the block of one of the drive and driven pulleys which has a smaller winding diameter, is introduced into the relational equations on the assumption that it is a predetermined value. The speed ratio between the drive pulley and the driven pulley, the number of rotations of the drive pulley, the input torque to the drive pulley, and the axial thrust of the driven pulley are measured to introduce them into the relational equations. Thereby at least one of the axial thrust of the drive pulley, either one of the urging force between the blocks at the outlet of the drive pulley or the urging force between the blocks at the inlet of the drive pulley, the axis-axis force between the drive and driven pulleys, the tensions of the ring at the outlet and the inlet of the drive pulley, the tangent component of the friction coefficient between the pulley and the block of the drive pulley, the tangent and radial components of the friction coefficient between the pulley and the block of the driven pulley, and the tangent component of the friction coefficient between the ring and the block of the one of the drive pulley and driven pulley which has a larger winding diameter can be calculated from the relational equations.

With the above feature, the axial thrust of the drive pulley, either one of the urging forces between the blocks at the outlet or inlet of the drive pulley, the axis-axis force between the drive and driven pulleys, the tensions of the ring at the outlet and the inlet of the drive pulley, the tangent component of the friction coefficient between the pulley and the block of the drive pulley, the tangent and radial components of the friction coefficient between the pulley and the block of the driven pulley, and the tangent component of the friction coefficient between the ring and the block of the one of the drive pulley and driven pulley which has the larger winding diameter, can be calculated without actually being measured by measuring only the four values of the speed ratio between the drive and driven pulleys, the number of rotations of the drive pulley, the input torque to the drive pulley and the axial thrust of the driven pulley. Thus, it is possible to easily and accurately determine the power-transmitted state of the metal belt-type continuous transmission.

To achieve the above object, according to a fifth aspect and feature of the present invention, there is provided a process for controlling the axial thrust in a metal belt-type continuously variable transmission using a process for presuming the power-transmitted state in the metal belt-type continuously variable transmission having the third or fourth feature described above. The process comprises the steps of calculating the tangent component and the radial component of the friction coefficient between the pulley and the block of a driven pulley, and controlling the axial thrust of the driven pulley based on a vector sum of both the components.

With the above feature, the axial thrust of the driven pulley is controlled based on the calculated friction coefficient between the driven pulley and the block and therefore, it is possible to avoid a slipping between the pulley and the block due to too small an axial thrust and friction between the pulley and the block due to a too large of a thrust.

The above and other objects, features and advantages of the invention will become apparent from the following description of the preferred embodiment taken in conjunction with the accompanying drawings.

BRIEF DESCRIPTION OF THE DRAWINGS

FIGS. 1 to 12 illustrate an embodiment of the present invention, wherein:

FIG. 1 is a schematic diagram of a power transmitting system in a vehicle equipped with a continuously variable transmission.

FIG. 2 is a partially perspective view of a metal belt.

FIG. 3 is an illustration for explaining the definition of loads applied to various portions of the continuously variable transmission and friction coefficients.

FIG. 5 is a diagram showing loads (including a radial component) applied to the block.

FIG. 8 is a diagram showing a load applied to a vertical section of a pulley.

FIG. 9 is a graph illustrating calculated values of the total friction coefficient $\mu_{DN}$ between a driven pulley and the block of the driven pulley.

FIG. 10 is a graph illustrating calculated values of the radial friction coefficient $\mu_{RDR}$ between a drive pulley and the block of the drive pulley.

FIG. 11 is a graph illustrating actually measured values and presumed values of the friction coefficient $\mu_{TDN}$ between the driven pulley and the block of the driven pulley.

FIG. 12 is a diagram for explaining the concept of an average friction coefficient.

DETAILED DESCRIPTION OF THE PREFERRED EMBODIMENTS

The present invention will now be described by way of an embodiment with reference to the accompanying drawings.

Figure 1:
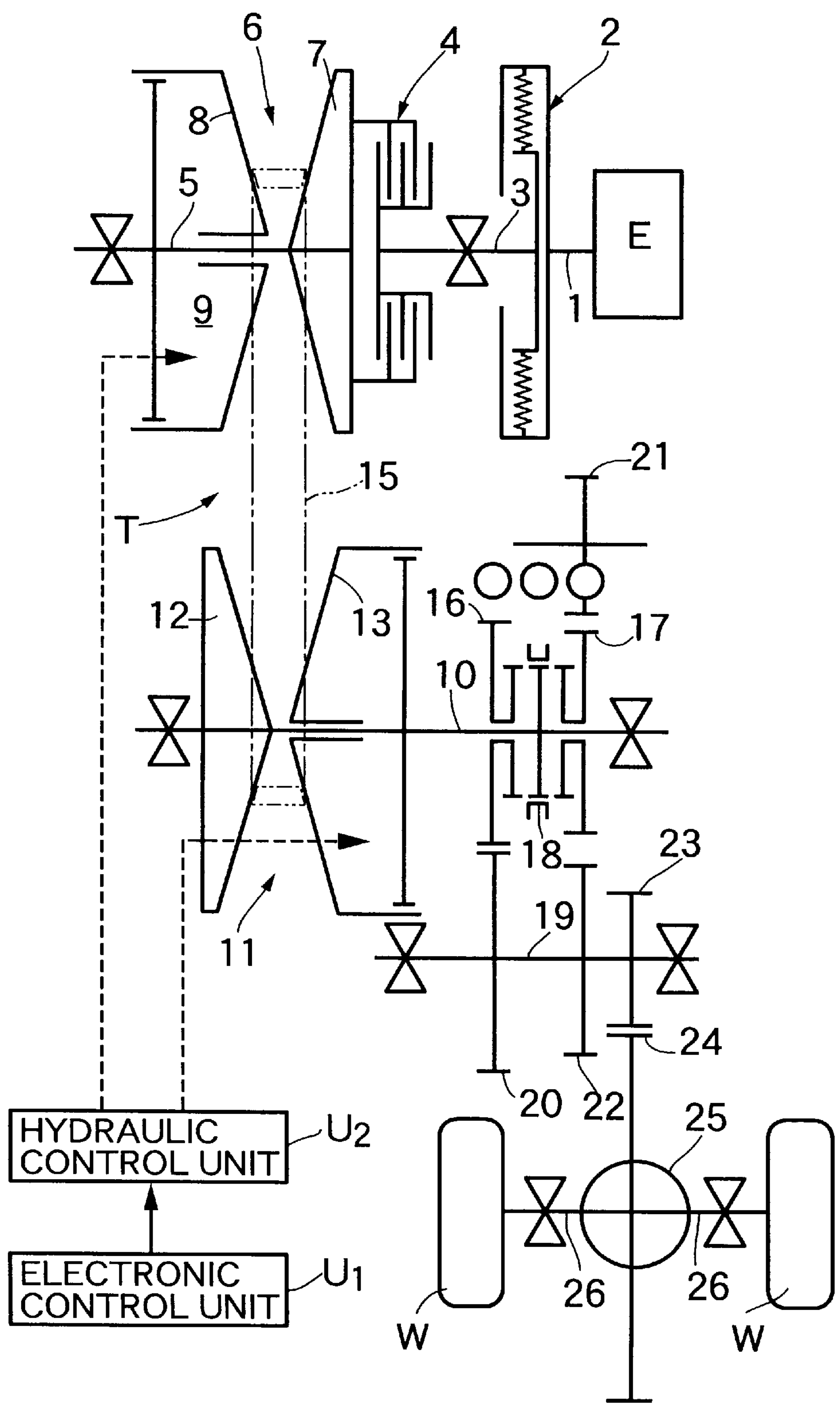

FIG. 1 illustrates schematically the structure of a metal belt-type continuously variable transmission T mounted in a vehicle. An input shaft 3 is connected to a crankshaft 1 of an engine E through a damper 2 and is also connected to a drive shaft 5 of the metal belt-type continuous transmission T through a starting clutch 4. A drive pulley 6 is mounted on the drive shaft 5 and includes a stationary pulley half 7 secured to the drive shaft 5, and a movable pulley half 8 which is movable toward and away from the stationary pulley half 7. The movable pulley half 8 is biased towards the stationary pulley half 7 by hydraulic pressure applied to an oil chamber 9.

Figure 2:
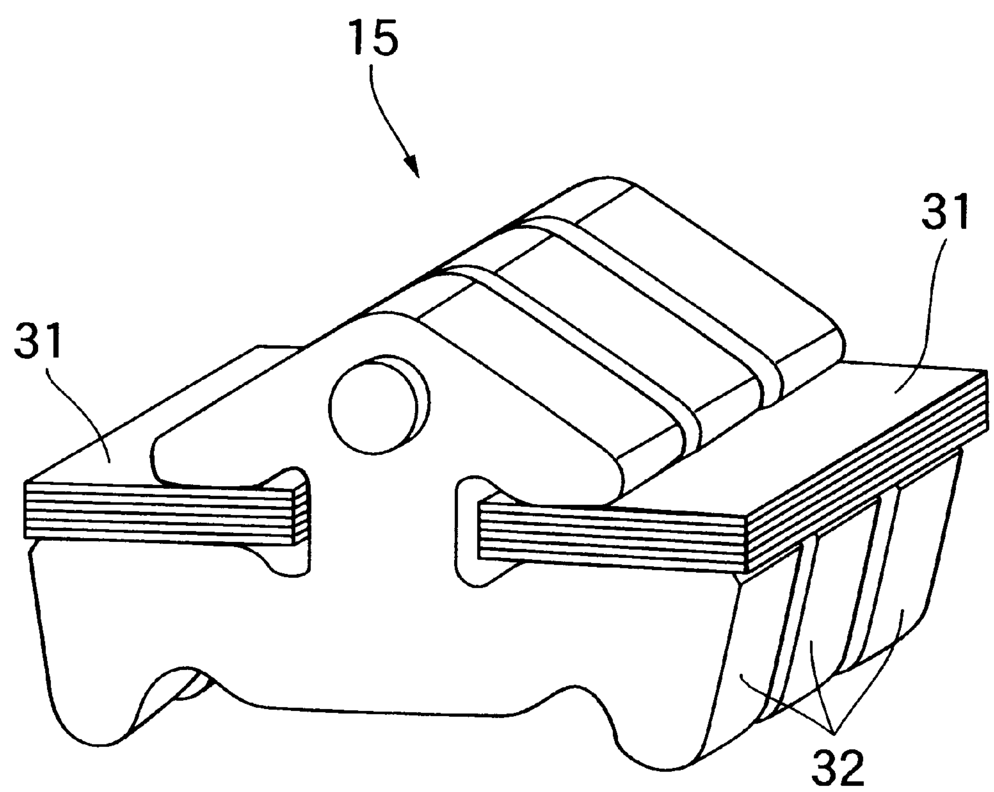

A driven pulley 11 is mounted on a driven shaft 10 disposed in parallel with the drive shaft 5, and includes a stationary pulley half 12 secured to the driven shaft 10, and a movable pulley half 13 which is movable towards and away from the stationary pulley half 12. The movable pulley half 13 is biased towards the stationary pulley half 12 by hydraulic pressure applied to an oil chamber 14. A metal belt 15 comprising a large number of metal blocks 32 each supported on a pair of left and right metal rings 31, 31, is reeved between the drive pulley 6 and the driven pulley 11 (see FIG. 2).

A forward drive gear 16 and a rearward drive gear 17 are relatively rotatably carried on the driven shaft 10 and are capable of being selectively coupled to the driven shaft 10 by a selector 18. Secured to an output shaft 19 disposed in parallel to the driven shaft 10, are a forward driven gear 20 meshed with the forward drive gear 16, and rearward driven gear 22 meshed with the rearward drive gear 17 through a rearward idle gear 21.

The rotation of the output shaft 19 is inputted through a final driven gear 23 and a final driven gear 24, to a differential 25 and transmitted therefrom through left and right axles 26, 26 to driven wheels W, W.

A driving force from an engine E is transmitted to the driven shaft 10 through the crankshaft 1, the damper 2, the input shaft 3, the starting clutch 4, the drive shaft 5, the drive pulley 6, the metal belt 15 and the driven pulley 11. When a forward travel range has been selected, the driving force from the driven shaft 10 is transmitted to the output shaft 19 through the forward drive gear 16 and the forward driven gear 20 to cause the forward traveling of the vehicle. When a rearward travel range has been selected, the driving force from the driven shaft 10 is transmitted to the output shaft 19 through the rearward drive gear 17, the rearward idle gear 21 and the rearward driven gear 22 to cause the rearward traveling of the vehicle.

During this time, the shift ratio of the metal belt-type continuously variable transmission T is continuously regulated by controlling the hydraulic pressure applied to the oil chamber 9 in the drive pulley 6 and the oil chamber 14 in the driven pulley 11 of the metal belt-type continuously variable transmission T by a hydraulic pressure control unit $U_2$, which is operated by a command from an electronic control unit $U_1$. More specifically, if the hydraulic pressure applied to the oil chamber 14 in the driven pulley 11 is increased relative to the hydraulic pressure applied to the oil chamber 9 in the drive pulley 6, groove width of the driven pulley 11 is decreased to increase the effective radius, and in accordance with this, groove width of the drive pulley 6 is increased to decrease the effective radius. Therefore, the shift ratio of the metal belt-type continuously variable transmission T is continuously varied toward a LOW range. Conversely, if the hydraulic pressure applied to the oil chamber 9 in the drive pulley 6 is increased relative to the hydraulic pressure applied to the oil chamber 14 in the driven pulley 11, the groove width of the drive pulley 6 is decreased to increase the effective radius and in accordance with this, the groove width of the driven pulley 11 is increased to decrease the effective radius. Therefore, the shift ratio of the metal belt-type continuously variable transmission T is continuously varied toward an OD range.

The concept of an average friction coefficient will be described with reference to FIG. 12.

Figure 12:
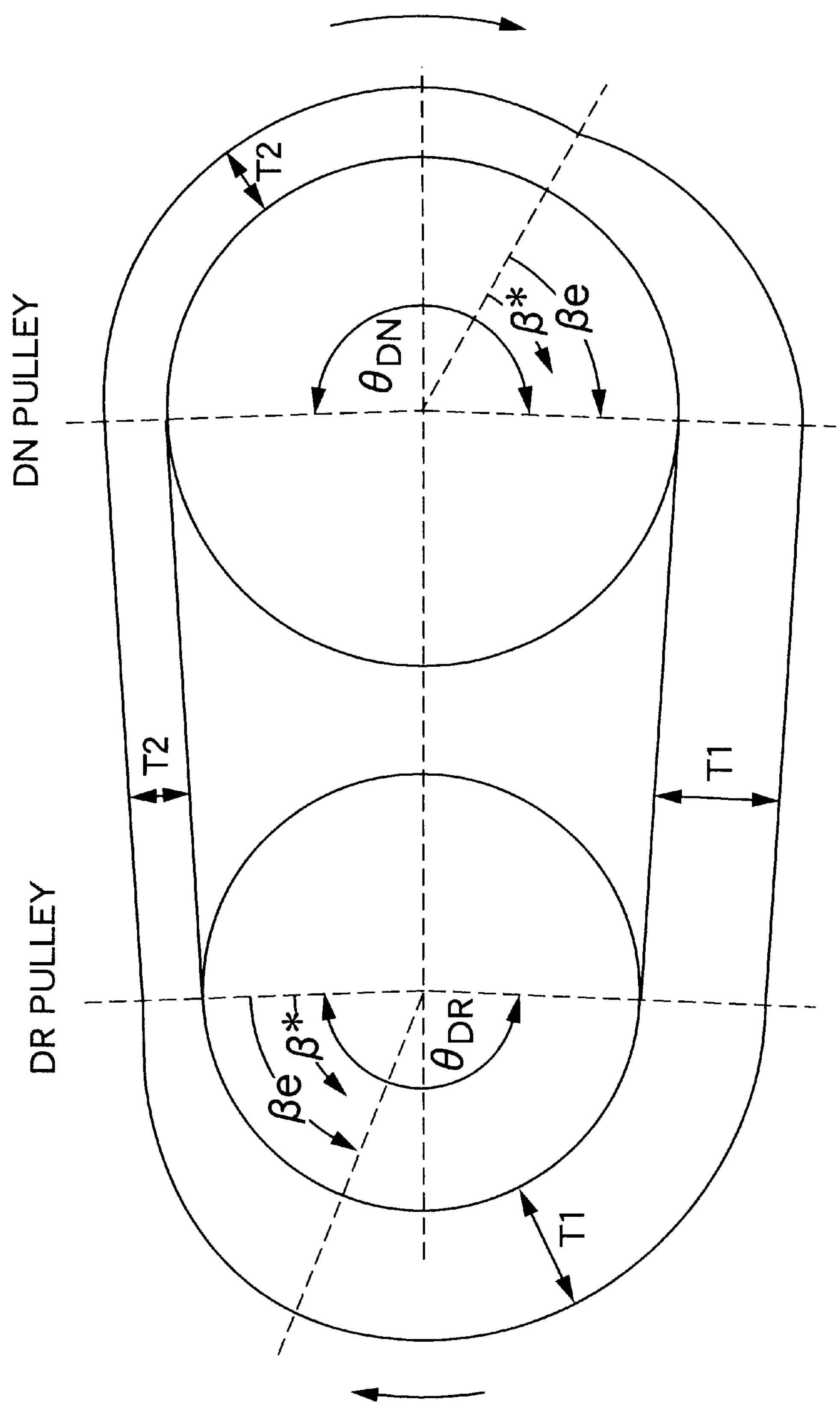

FIG. 12 shows the state in which the metal belt has been reeved around the drive pulley and the driven pulley, wherein the thickness of the metal belt shown in FIG. 12 diagrammatically, represents the magnitude of the tension of the metal belt. The apparent winding angle of the metal belt is θ; the tension of the returning side of the metal belt is $T_1$; the tension of the driving side is $T_2$; the friction coefficient between the belt and the pulley is μ; and the angle measured from a point at which the tension of the belt starts to be varied from $T_2$ is β*. The tension T of the metal belt is based on an Euler friction belt transmission theory according to the following equation (1):

$$T=T_2 \exp(\mu\beta^*) \tag{1}$$

The equation (1) is established for both of the drive pulley and the driven pulley.

The transmission of the power between the belt and the pulley is carried out in the range of 0<θ<βe (the range in which the tension T of the metal belt is varied) which is called the active arc. In contrast, in the range which is called the idle arc and in which the tension T is not varied, the transmission of the power between the belt and the pulley is not carried out. Using the equation (1), the tension $T_1$ of the returning side of the metal belt is given according to an equation (2):

$$T_1=T_2 \exp(\mu\beta e) \tag{2}$$

In this way, the transmission of the power between the belt and pulley is carried out in the active arc. However, if it is considered that the transmission of the power is carried out in the entire range of the winding angle θ, the concept of an average friction coefficient $\mu_{AV}$ which is an apparent friction coefficient, must be introduced in order to establish the following equation (3):

$$T_1=T_2 \exp(\mu_{AV}\theta) \tag{3}$$

In the equation (3), the average friction coefficient $\mu_{AV}$ is given according to the following equation (4):

$$\mu_{AV}=(1/\theta)\log(T_1/T_2)=(1/\theta)\log(T_{IN}/R_{DR}T_2+1) \tag{4}$$

wherein $T_{IN}$ is the input torque to the drive pulley and $R_{DR}$ is the pitch radius of the drive pulley. In a no-load state, $\mu_{AV}=0$. In an entire slip state, $\mu_{AV}=\mu$.

The friction coefficient in the description made hereinafter indicates the above-described average friction coefficient $\mu_{AV}$.

A technique for presuming a power-transmitted state of the metal belt-type continuously variable transmission, including the friction coefficient between the block of the metal belt and the pulley and the friction coefficient between the ring and the block, will be described below.

Figure 3:
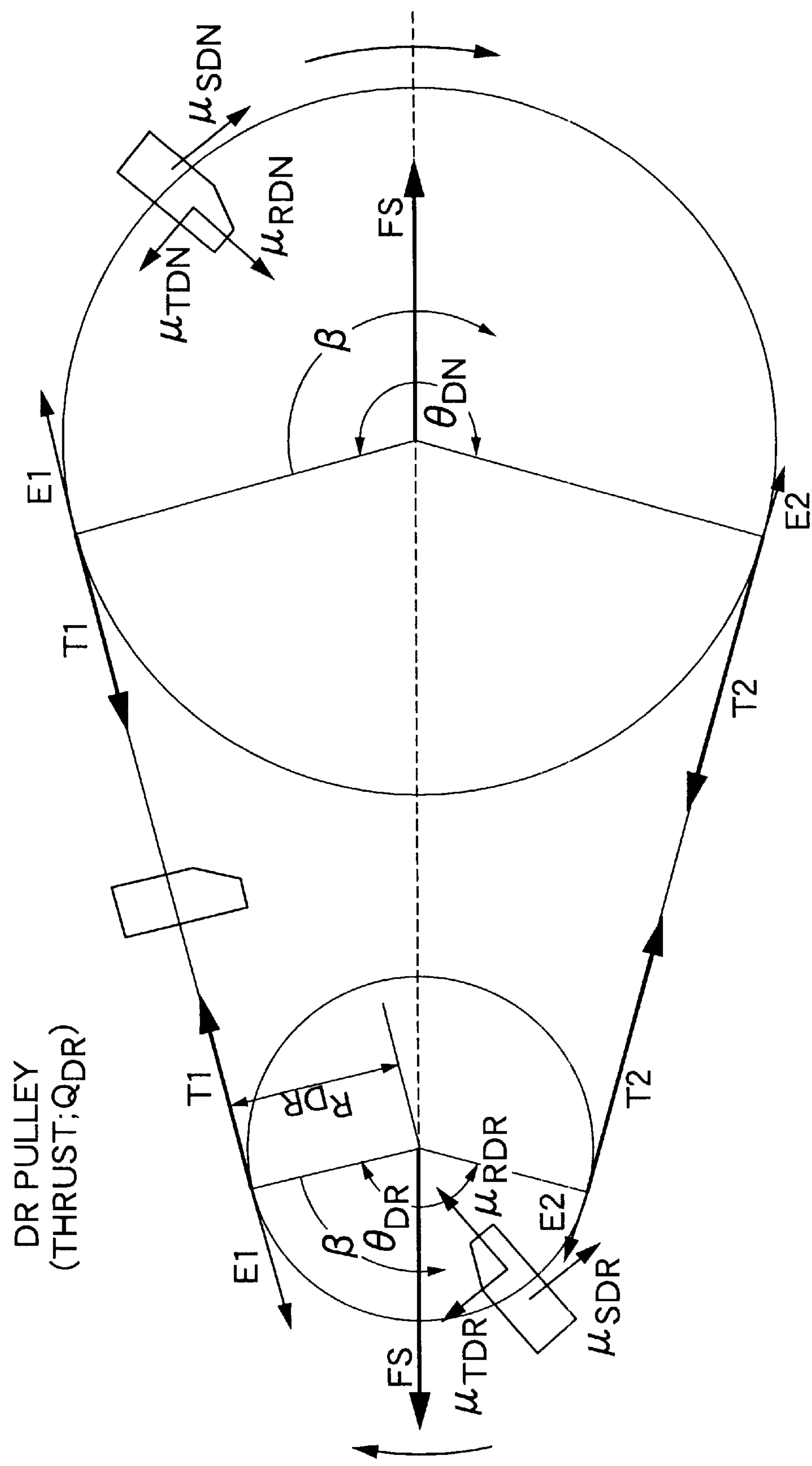

FIG. 3 illustrates a metal belt-type continuous transmission in a steady operational state, wherein the meaning of characters used in FIG. 3 is as follows:

$E_1$: the urging force between the blocks at the outlet of the drive pulley (N)

$E_2$: the urging force between the blocks at an inlet of the drive pulley (N)

$T_1$: the tension of the ring at the outlet of the drive pulley (N)

$T_2$: the tension of the ring at the inlet of the drive pulley (N)

$Q_{DR}$: the axial thrust of the drive pulley (N/rad)

$Q_{DN}$: the axial thrust of the driven pulley (N/rad)

$\theta_{DR}$: the angle of winding of the metal belt around the drive pulley (rad)

$\theta_{DN}$: the angle of winding of the metal belt around the driven pulley (rad)

FS: the axis-axis force between the drive pulley and the driven pulley (N)

Figures 4A, 4B:
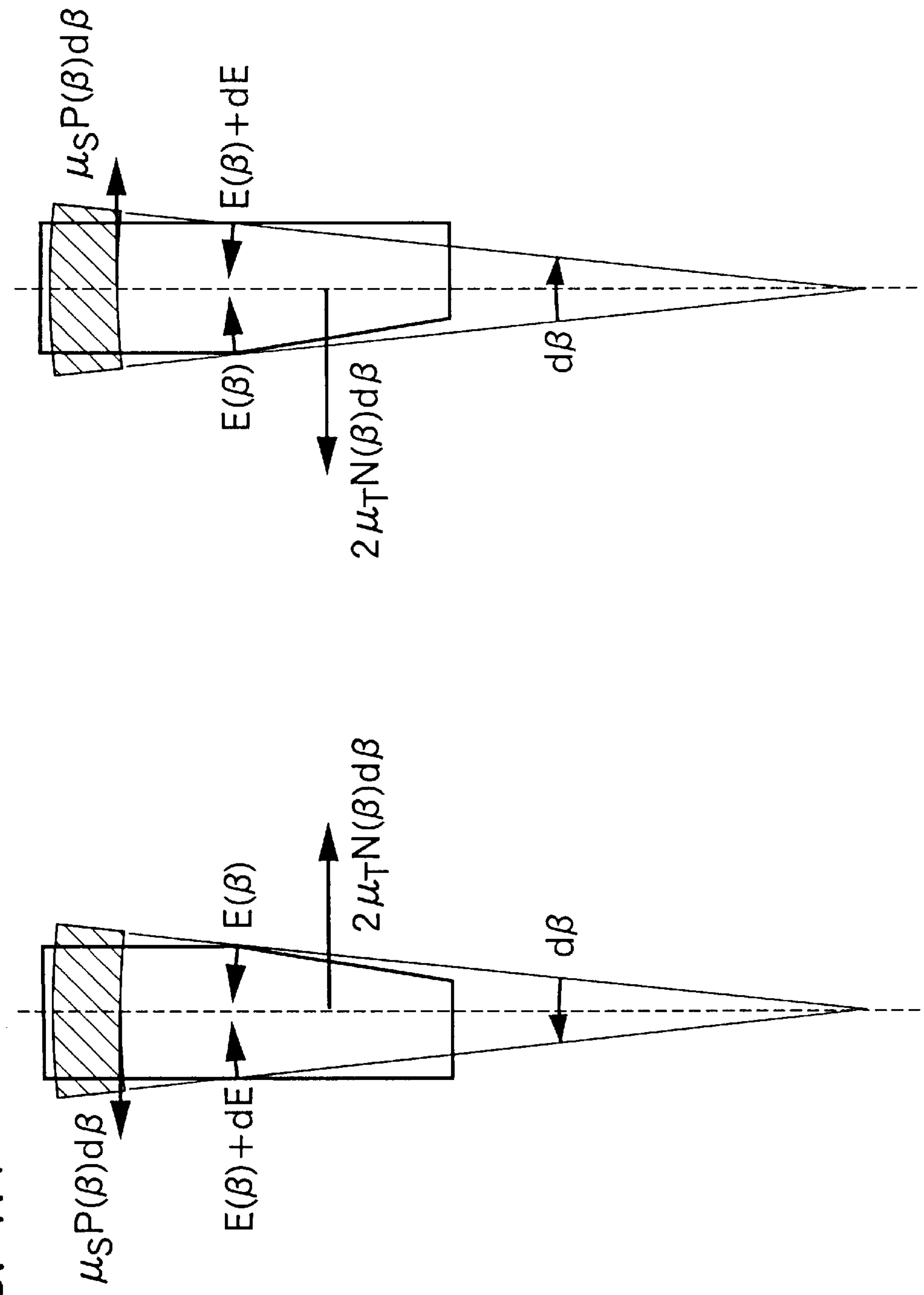
FIGS. 4A and 4B are diagrams showing loads (including a tangent component) applied to a block.

$\mu_{TDR}$: the tangent component of the friction coefficient between the pulley and the block in the drive pulley $\mu_{TDN}$: the tangent component of the friction coefficient between the driven pulley and the block in the driven pulley $\mu_{RDR}$: the radial component of the friction coefficient between the drive pulley and the block in the drive pulley $\mu_{RDN}$: the radial component of the friction coefficient between the driven pulley and the block in the driven pulley $\mu_{SDR}$: the tangent component of the friction coefficient between the ring and the block in the drive pulley $\mu_{SDN}$: the tangent component of the friction coefficient between the ring and the block in the driven pulley FIGS. 4A and 4B show only those of forces applied to the block which include a tangent component, wherein E: the urging force between the blocks (N)

P: the urging force between the ring and block (N/rad)

N: the urging force between the pulley and block (N/rad)

Figure 5:
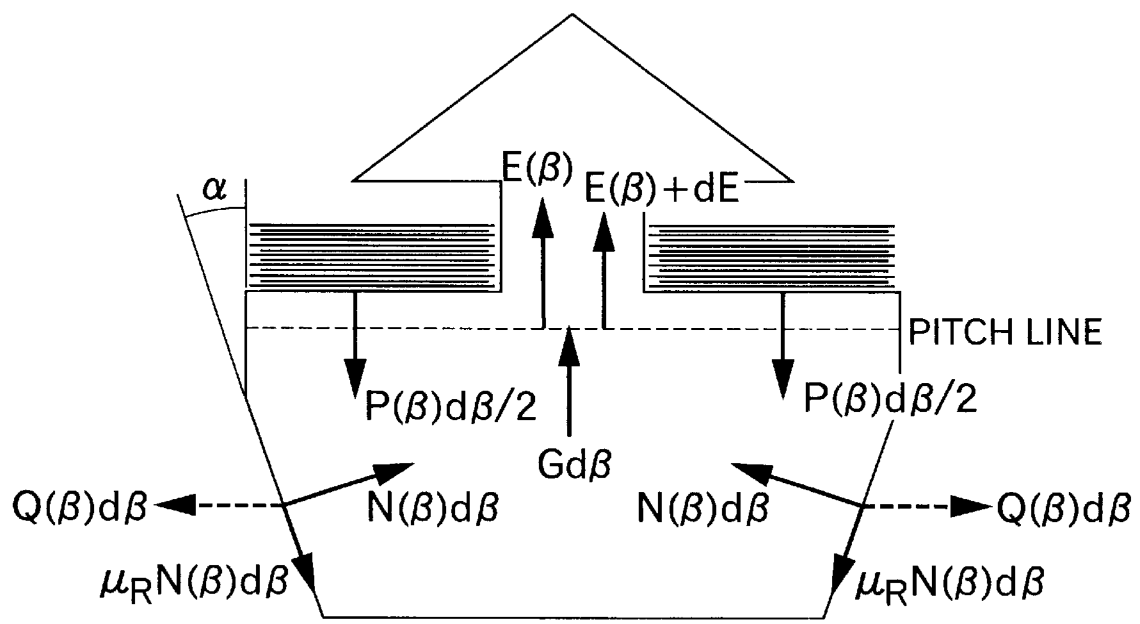

FIG. 5 shows only those of forces applied to the block which include a radial component, wherein Q: the axial thrust (N/rad)

G: the centrifugal force (N/rad)

α: the inclination angle of a V-bevel face of the pulley (rad)

FIGS. 6A, 6B, 7A and 7B show only those of forces applied to the ring which include a tangent component, and only those of such forces which include a radial component, wherein T: the ring tension (N)

As shown in FIG. 3, the balance relationship derived from FIGS. 4A to 7B can be handled in the same equation for the drive pulley and the driven pulley by defining the angle p in opposite directions for the drive pulley and the driven pulley.

First, the following equation (5) is derived from the balance relationship of the tangent forces applied the n-th block in FIGS. 4A and 4B:

$$2\mu_T N^{(n)} + E^{(n+1)}\cos\frac{\Delta\beta}{2} = E^{(n)}\cos\frac{\Delta\beta}{2} + \mu_s P^{(n)} \quad (5)$$

The following equation (6) is derived from the balance relationship of the radial forces applied to the n-th block in FIG. 5:

$$P^{(n)} + 2\mu_R N^{(n)}\cos\alpha = G^{(n)} + 2N^{(n)}\sin\alpha + E^{(n+1)}\sin\frac{\Delta\beta}{2} + E^{(n)}\sin\frac{\Delta\beta}{2} \quad (6)$$

Figure 6B:
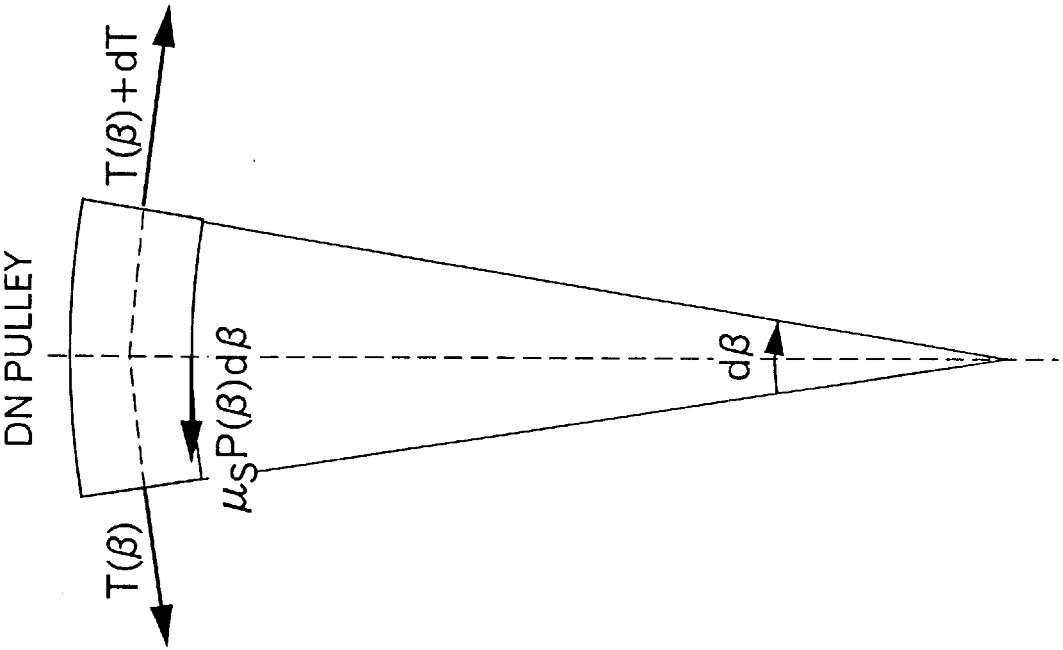
FIGS. 6A and 6B are diagrams showing loads (including a tangent component) applied to a ring.
Figure 6A:
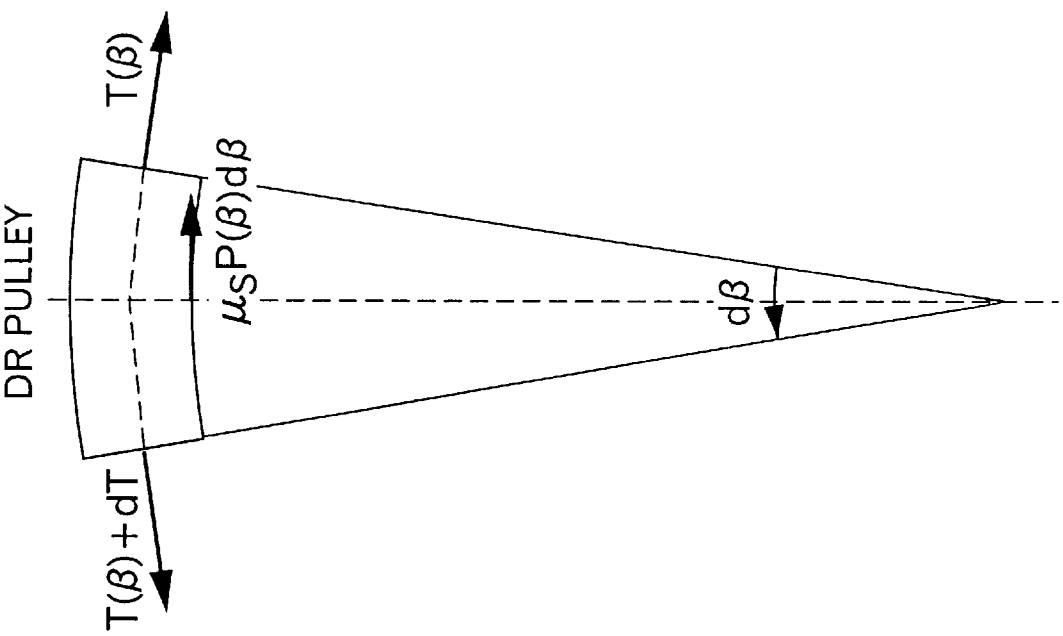

The following equation (7) is derived from the balance relationship of the tangent forces applied to the ring in FIGS. 6A and 6B:

$$T^{(n)}\cos\frac{\Delta\beta}{2} + \mu_s P^{(n)} = T^{(n+1)}\cos\frac{\Delta\beta}{2} \quad (7)$$

Figure 7B:
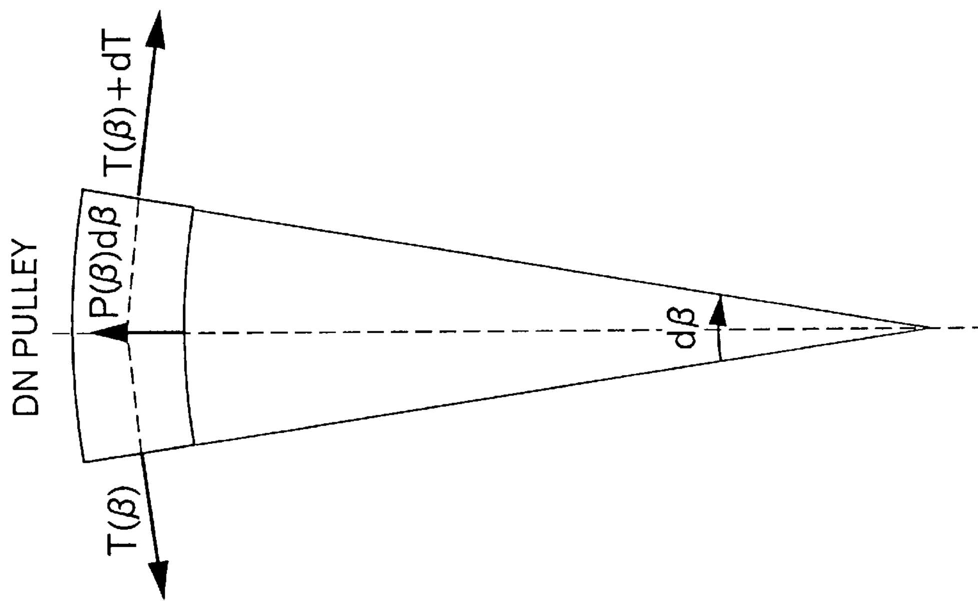
FIGS. 7A and 7B are diagrams showing loads (including a radial component) applied to the ring.
Figure 7A:
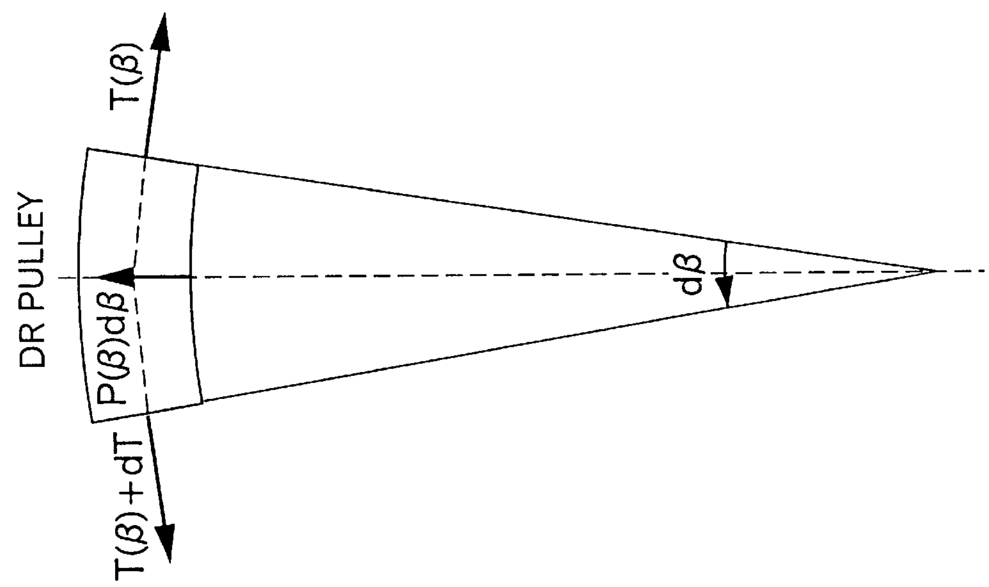

The following equation (8) is derived from the balance relationship of the radial forces applied to the ring in FIGS. 7A and 7B:

$$T^{(n)}\sin\frac{\Delta\beta}{2} + T^{(n+1)}\sin\frac{\Delta\beta}{2} = P^{(n)} \quad (8)$$

The following equation (9) is derived from the balance relationship of the axial thrusts applied to the n-th block in FIG. 5:

$$N^{(n)}\cos\alpha + \mu_R N^{(n)}\sin\alpha = Q^{(n)} \quad (9)$$

If $\Delta\beta$ becomes $d\beta$ on the assumption that the thickness of the block is sufficiently small, the following approximations can be obtained: $\cos d\beta/2=1$; $\sin d\beta/2=d\beta/2$; $dE\cdot d\beta=0$; and $dT\cdot d\beta=0$. Therefore, equations (5) to (9) can be rewritten into the following equations (10) to (14) which are basic equations for presuming the operational state of the metal belt-type continuously variable transmission.

$$\frac{dE}{d\beta} = \mu_s P - 2\mu_T N \quad (10)$$

$$P - E = G + 2N(\sin\alpha - \mu_r\cos\alpha) \quad (11)$$

$$\frac{dT}{d\beta} = \mu_s P \quad (12)$$

$$T = P \quad (13)$$

$$Q = N(\cos\alpha + \mu_R\sin\alpha) \quad (14)$$

Then, the boundary conditions applied for the formation of the basic equations are listed below.

First, the following equations (15) and (16) are established from the fact that the urging forces E between the blocks at the opposite ends of chords in FIG. 3 are equal to each other:

$$E = E_1 \text{ (where } \beta = 0) \quad (15)$$

$$E = E_2 \text{ (where } \beta = \theta_{DR} = \theta_{DN}) \quad (16)$$

The following equations (17) and (18) are established from the fact that the ring tensions at the opposite ends of the chord are equal to each other:

$$T = T_1 \text{ (where } \beta = 0) \quad (17)$$

$$T \text{ (where } \beta = \theta_{DR}) = T \text{ (where } \beta = \theta_{DN}) = T_2 \quad (18)$$

Axial thrusts $Q_{DR}$ and $D_{DN}$ of the drive pulley and the driven pulley are given according to the following equation (19):

$$\int_0^{\theta_{DR}} Q(\beta)d\beta = Q_{DR} \int_0^{\theta_{DN}} Q(\beta)d\beta = Q_{DN} \quad (19)$$

The input torque $T_{IN}$ (transmitted torque) into the drive pulley is given as a sum of a difference of the urging force between the blocks in a pair of chords and a difference of the ring tension according to the following equation (20):

$$\frac{T_{IN}}{R_{DR}} = (E_1 - E_2) + (T_2 - T_1) \quad (20)$$

Figure 8:
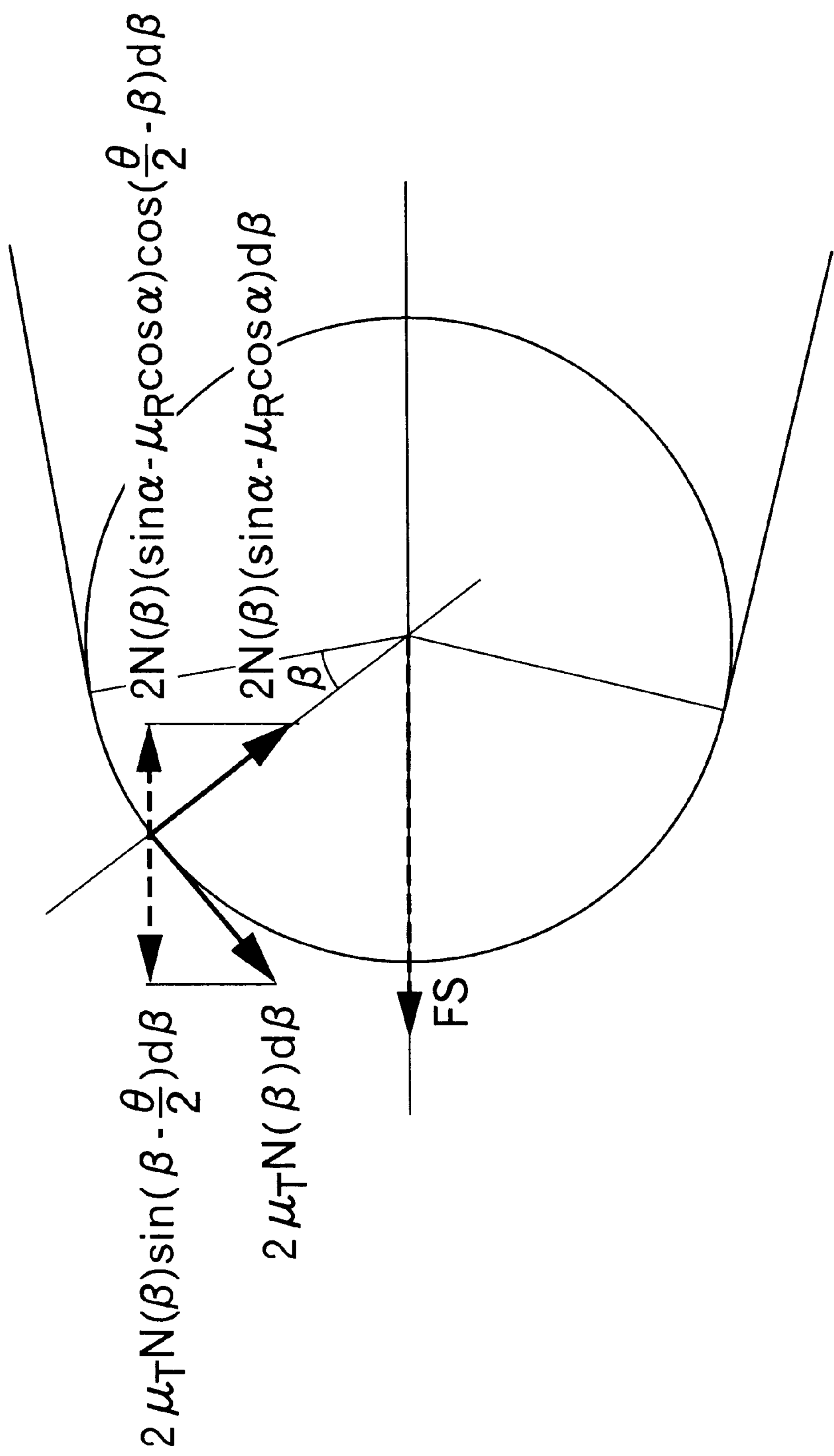

As can be seen from FIG. 8, an axis-axis force FS is given as the sum between axial components applied from the blocks to the pulley according to the following equation (21):

$$FS = \int_0^{\theta_{DR}} 2\{N(\beta)(\sin\alpha - \mu_R\cos\alpha)\}d\beta\cos\alpha\left(\frac{\theta}{2} - \beta\right) + \int_0^{\theta_{DN}} 2N(\beta)\mu_T\sin\left(\beta - \frac{\theta}{2}\right)d\beta \quad (21)$$

On basis of the basic equations (10) to (13) and the boundary conditions (14) to (21) obtained in the above manner, relations required for calculating six friction coefficients $\mu_{TDR}$, $\mu_{TDN}$, $\mu_{RDR}$, $\mu_{RDN}$, $\mu_{SDR}$ and $\mu_{SDN}$, $T_1$ (the tension of the ring at the outlet of the drive pulley) and $T_2$ (the tension of the ring at the inlet of the drive pulley) can be derived from i (a speed ratio: $N_{IN}/N_{OUT}$, where $N_{IN}$ is the number of rotations of the drive pulley and $N_{OUT}$ is the number of rotations of the driven pulley); $N_{IN}$ (the number of rotations of the drive pulley); $T_{IN}$ (the input torque to the drive pulley); $Q_{DR}$ (the axial thrust of the drive pulley); $Q_{DN}$ (the axial thrust of the driven pulley); $E_1$ (the urging force between the blocks at the outlet of the drive pulley); and FS (the axis-axis force between the drive pulley and driven pulley). One of $E_1$ and $E_2$ (the urging force between blocks in the chord to which the driving force of the metal belt 15 is not transmitted) is 0 (zero). When $E_1=0$, $E_2$ is used in place of $E_1$. The mathematical technique required for deriving the above-described relational equations is not related to the essential subject of the present invention and hence, the description thereof is omitted.

The i, $N_{IN}$, $Q_{DR}$, $Q_{DN}$, $E_1$ (or $E_2$) and FS used in the relational equations are measurable and called input variables. The $\mu_{TDR}$, $\mu_{TDN}$, $\mu_{RDR}$, $\mu_{RDN}$, $\mu_{SDR}$, $\mu_{SDN}$, $T_1$ and $T_2$ used in the relational equations are difficult to measure and hence, called output variables. Thus, the output variables can be calculated by measuring the input variables and applying them to the relational equations.

Using a transmission oil with a friction coefficient regulated by the addition of a predetermined amount of an FM agent thereto, values of the input variables were detected, while the metal belt-type continuous transmission was being operated in a plurality of different steady operational states, and values of the output variables were calculated based on these input variables. As a result, the following tendencies (1), (2) and (3) were found in the calculated values of the output variables:

(1) The tangent friction coefficient $\mu_S$ ($\mu_{SDR}$ or $\mu_{SDN}$) between the ring and the block of the smaller-diameter pulley is substantially constant ($\mu_S$=0.1) irrespective of transmitting conditions at a torque ratio r≧0.5.

(2) The total friction coefficient IDN between the pulley and the block of the driven pulley is substantially constant ($\mu_{DN}$=0.1) irrespective of the transmitting conditions at a torque ratio r≧0.5.

(3) The radial friction coefficient friction coefficient $\mu_{RDR}$ between the pulley and the block of the drive pulley is substantially constant ($\mu_{RDR}$=0) irrespective of the transmitting conditions at a torque ratio r≧0.5.

In the item (1), the term "smaller-diameter pulley" corresponds to the driven pulley in a state in which the speed ratio i ($N_{IN}$ is the number of rotations of the drive pulley and $N_{OUT}$ is the number rotations of the driven pulley) is smaller than 1 (a speed-increasing state), and to the drive pulley in a state in which the speed ratio i is equal to or larger than 1 (a speed-decreasing state). If the current transmission torque is $T_{IN}$, and the transmittable maximum torque is $T_{IN}^*$, the torque ratio r is defined as being $T_{IN}/T_{IN}^*$. The torque ratio r≧0.5 corresponds to a practical torque range of the metal belt-type continuously variable transmission.

In the item (2), the total friction coefficient $\mu_{DN}$ between the pulley and the block is the vector sum total of the tangent component $\mu_{TDN}$ of the friction coefficient between the pulley and the block of the driven pulley and the radial component $\mu_{RDN}$ of the friction coefficient between the pulley and the block of the driven pulley, and is given according to the following equation (22):

$$\mu_{DN}=(\mu_{TDN}^2+\mu_{RDN}^2)^{1/2} \quad (22)$$

In the above-described experiment, the value of each of $\mu_S$=0.1 in the item (1), $\mu_{DN}$=0.1 in the item (2) and $\mu_{RDR}$=0 in the item (3) is substantially constant irrespective of the operational state of the metal belt-type continuous transmission, but is varied depending upon the temperature and degree of deterioration of the transmission oil, the amount of an additive in the transmission oil and the like.

Figure 9:
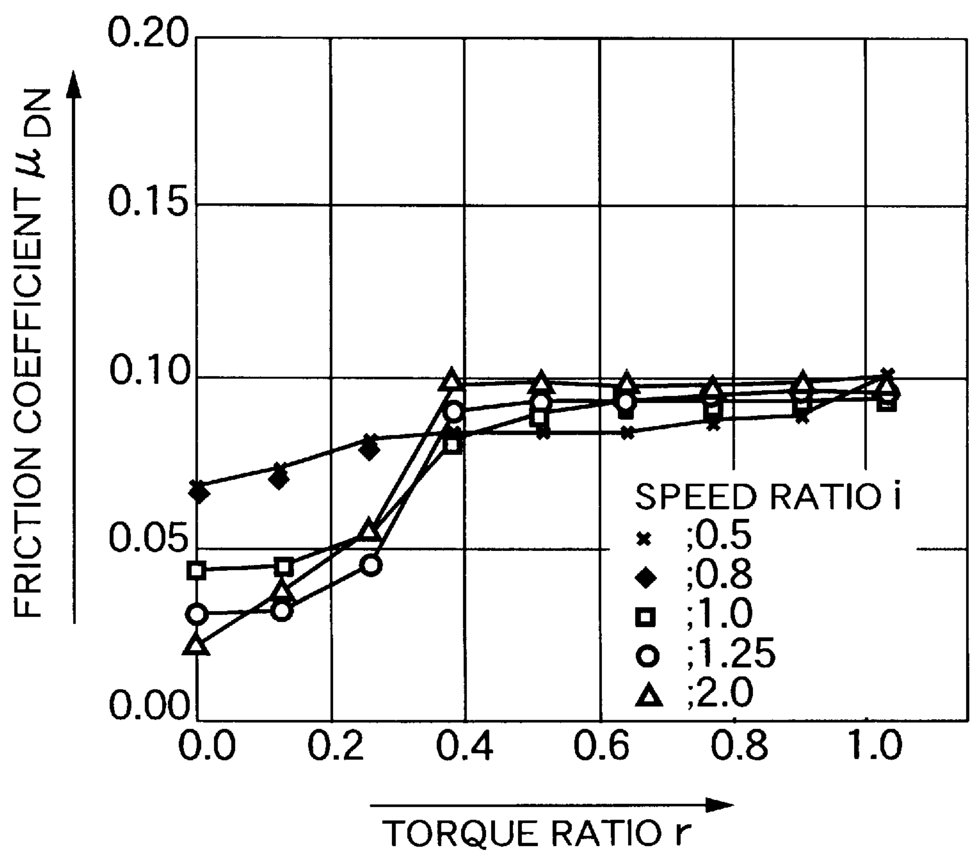

FIG. 9 shows results obtained by measuring the values of the input variables while finely varying the speed ratio i and the torque ratio r, and then calculating the total friction coefficients $\mu_{DN}$ between the pulley and the block of the driven pulley based on such input variables. As is apparent from FIG. 9, $\mu_{DN}$ is smaller than a predetermined value (0.1) in a range of the torque ratio r smaller than 0.4, but $\mu_{DN}$ is substantially equal to the predetermined value (0.1) in a practical range of the torque ratio r equal to or larger than 0.4.

Figure 10:
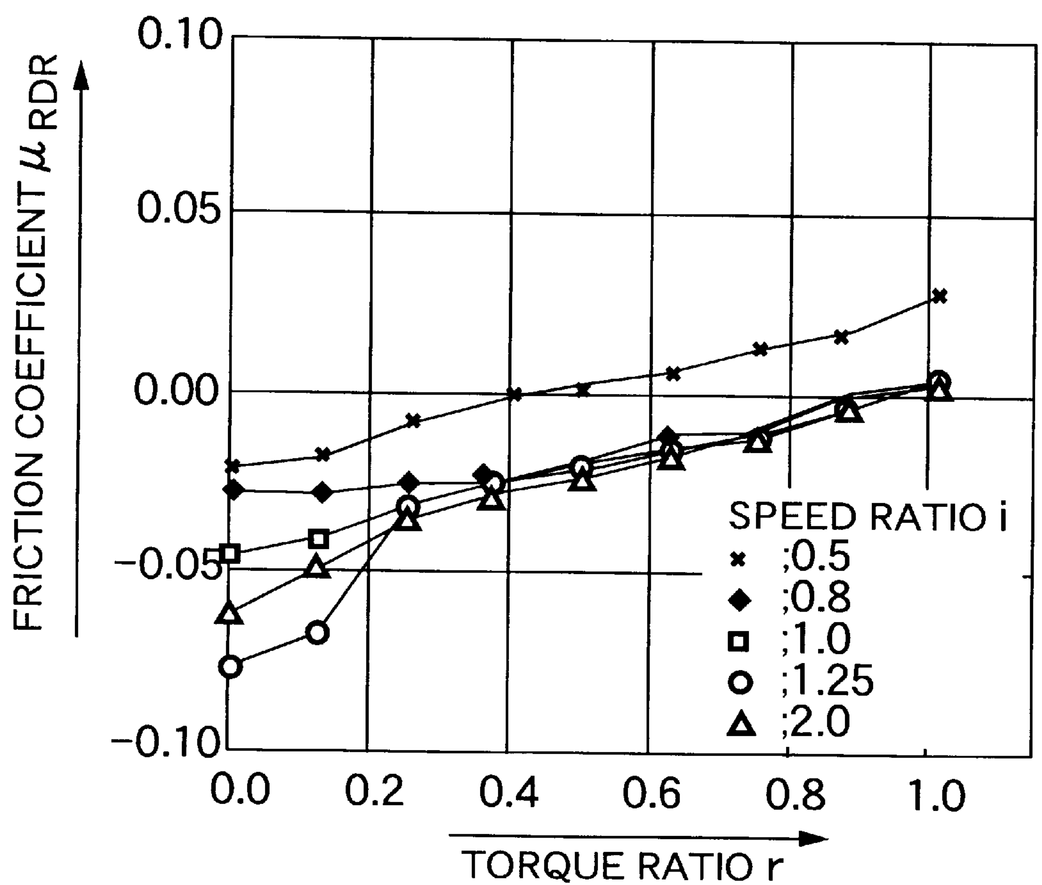

FIG. 10 shows results obtained by measuring the values of the input variables, while finely varying the speed ratio i and the torque ratio r, and then calculating the radial friction coefficients $\mu_{RDR}$ between the drive pulley and the block of the drive pulley based on such input variables. As is apparent from FIG. 10, $\mu_{RDR}$ is substantially equal to a predetermined value (0) in the practical range of the torque ratio r equal to or larger than 0.4.

If the total friction coefficients $\mu_{DN}$ between the driven pulley and the block of the driven pulley given according to the equation (22) is known, one of the tangent component $\mu_{TDN}$ of the friction coefficient between the pulley and the block of the driven pulley and the radial component $\mu_{RDN}$ of the friction coefficient between the pulley and the block of the driven pulley can be calculated from the other.

From the foregoing, $\mu_S$ of the smaller-diameter pulley, i.e., either one of $\mu_{SDR}$ or $\mu_{SDN}$ can be treated as a known value (e.g., 0.1); either one of $\mu_{TDN}$ or $\mu_{RDN}$ which are components of the total friction coefficient $\mu_{DN}$ (e.g., 0.1) between the driven pulley and the block of the driven pulley can be treated as the other dependent variable, i.e., $\mu_{RDN}=(0.1^2-\mu_{TDN}^2)^{1/2}$ or $\mu_{TDN}=(0.1^2-\mu_{RDN}^2)^{1/2}$; and the radial friction coefficient $\mu_{RDR}$ between the drive pulley and the block of the drive pulley can be treated as a known value (e.g., 0). In this way, if the two friction coefficients of the eight output variables $\mu_{TDR}$, $\mu_{TDN}$, $\mu_{RDR}$, $\mu_{RDN}$, $\mu_{SDR}$, $\mu_{SDN}$, $T_1$ and $T_2$ are known values, and the one friction coefficient of them is the variable dependent on the other friction coefficients, any in place of them, three of the eight input variables i, $N_{IN}$, $T_{IN}$, $Q_{DR}$, $Q_{DN}$, $E_1$ (or $E_2$) and FS can be treated as unknown values.

Thereupon, if the three input variables $Q_{DR}$, $E_1$ (or $E_2$) and FS which are relatively difficult to detect, are treated as the output variables, the remaining five output variables $\mu_{SDN}$ (or $\mu_{SDR}$), $\mu_{RDN}$, $\mu_{TDN}$, $T_1$ and $T_2$ and the $Q_{DR}$, $E_1$ (or $E_2$) and FS treated as the unknown output variables, can be presumed based on the fact that the remaining five input variables i, $N_{IN}$, $T_{IN}$, $Q_{DN}$, $E_2$ (or $E_1$), the two friction coefficients $\mu_{SDR}$ (or $\mu_{SDN}$) and $\mu_{RDR}$ treated as the known input variables and one of $\mu_{TDN}$ or $\mu_{RDN}$ are the other dependent variables, and the fact that $E_2$ or $E_1$ is 0.

In the above manner, even if the temperature and degree of deterioration of the transmission oil, the amount of the additive in the transmission oil and the like are varied, the values $Q_{DR}$, $E_1$ (or $E_2$), $T_1$, $T_2$ and FS can be presumed from only the operational conditions i, $N_{IN}$, $T_{IN}$ and $Q_{DN}$, if the values of the friction coefficients $\mu$ depending upon such varied values are used.

Figure 11:
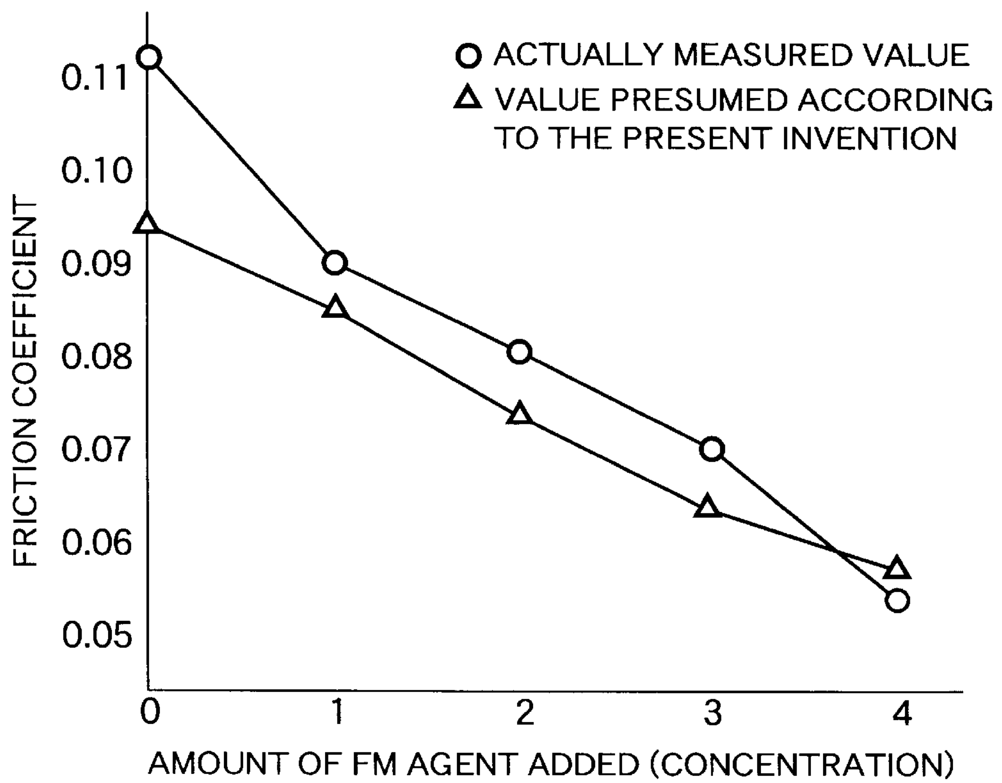

FIG. 11 shows actually measured values and presumed values of the friction coefficient $\mu_{DN}$ between the driven pulley and the block with respect to the amount of FM agent added to the transmission oil. As apparent from FIG. 11, it can be seen that the value $\mu_{DN}$ presumed according to the present invention corresponds with the actually measured value $\mu_{DN}$ extremely well.

In another embodiment of the present invention, the axial thrust $Q_{DR}$ of the drive pulley can be calculated without being measured, by forming the relational equations indicating the relationships of the thirteen variables i, $N_{IN}$, $T_{IN}$, $Q_{DN}$, $Q_{DR}$, $E_1$ (or $E_2$), $T_1$, $T_2$, FS, $\mu_{RDR}$, $\mu_{TDN}$ and $\mu_{RDN}$; actually measuring four variables i, $N_{IN}$, $T_{IN}$ and $Q_{DN}$ of these thirteen variables; and introducing them into the relational equations on the assumption that $\mu_{RDR}$, the vector sum of $\mu_{TDN}$ and $\mu_{RDN}$=a predetermined value (e.g., 0) and that $\mu_{DN}$=a predetermined value (e.g., 0.1).

In a further embodiment of the present invention, the urging force $E_1$ (or $E_2$) between the blocks at the outlet of the drive pulley, the tension $T_1$ of the ring at the outlet of the drive pulley and the tension $T_2$ of the ring at the inlet of the drive pulley can be calculated without being actually measured, by forming the relational equations indicating the relationships of the twelve variables i, $N_{IN}$, $T_{IN}$, $Q_{DN}$, $Q_{DR}$, $E_1$ (or $E_2$), $T_1$, $T_2$, FS, $\mu_{SDR}$ and $\mu_{SDN}$; actually measuring four variables i, $N_{IN}$, $T_{IN}$ and $Q_{DN}$ of these twelve variables; and introducing them into the relational equations on the assumption that one Of $\mu_{SDR}$ and $\mu_{SDN}$=a predetermined value (e.g., 0.1).

Further, by forming the relational equations indicating the relationships of the sixteen variables i, $N_{IN}$, $T_{IN}$, $Q_{DN}$, $Q_{DR}$, $E_1$ (or $E_2$), $T_1$, $T_2$, FS, $\mu_{TDR}$, $\mu_{TDN}$, $\mu_{RDR}$, $\mu_{RDN}$, $\mu_{SDR}$ and $\mu_{SDN}$; actually measuring six variables i, $N_{IN}$, $T_{IN}$, $Q_{DN}$, $Q_{DR}$ and FS of these sixteen variables; and introducing them into the relational equations on the assumption that one of $\mu_{SDR}$ or $\mu_{SDN}$=a predetermined value (e.g., 0.1), $E_1$ (or $E_2$), $T_1$, $T_2$, the other of $\mu_{SDR}$ or $\mu_{SDN}$, $\mu_{TDR}$, $\mu_{TDN}$, $\mu_{RDR}$ and $\mu_{RDN}$ can be calculated at a real time. Therefore, for example, if the friction coefficient $\mu_{DN}$ between the driven pulley and the block is calculated, the axial thrust $Q_{DN}$ of the driven pulley for preventing the slipping of the metal belt on the driven pulley, can be controlled in accordance with such friction coefficient $\mu_{DN}$ to prevent the slipping of the metal belt.

In other words, if the safety rate of the thrust, is represented by SF, the axial thrust $Q_{DN}$ of the driven pulley is given according to the following equation:

$$Q_{DN} = \frac{T_{IN}\cos\alpha}{2\mu_{DN} R_{DR}} SF \tag{23}$$

Therefore, the slipping of the metal belt can be effectively prevented, while avoiding a reduction in durability of the metal belt due to the excessive axial thrust $Q_{DN}$, to enhance the durability, by controlling the axial thrust $Q_{DN}$ of the driven pulley in accordance with the friction coefficient $\mu_{DN}$ between the driven pulley and the block in the equation (23). In this case, it is necessary to vary the axial thrust $Q_{DR}$ of the drive pulley in accordance with the axial thrust $Q_{DN}$ of the driven pulley, so that the shaft ratio is not varied by the variation in axial thrust $Q_{DN}$ of the driven pulley. If $Q_{DR} \leqq Q_{DN}$ in a certain operational state, a presumed value of the friction coefficient $\mu_{DN}$ between the driven pulley and the block can be applied as it is, to control the axial thrust $Q_{DR}$ of the drive pulley.

Although the present invention has been described in detail, it will be understood that the present invention is not limited to the above-described embodiment, and various modifications may be made without departing from the spirit and scope of the invention defined in claims.

For example, all of $Q_{DR}$, $E_1$ ($E_2$), FS, $T_1$, $T_2$, $\mu_{TDR}$, $\mu_{TDN}$, $\mu_{RDN}$, $\mu_{SDR}$ (or $\mu_{SDN}$) need not be calculated, and at least one of them may be calculated according to the purpose.

What is claimed is:

1. A process for presuming a power-transmitted state in a metal belt-type continuously variable transmission said transmission comprising a metal belt having rings and a plurality of blocks supported on said rings, a drive pulley and a driven pulley, wherein said metal belt is reeved around said drive pulley and said driven pulley, and wherein a shift ratio is controlled by changing groove widths of both said drive and driven pulleys by controlling the hydraulic pressure thereon, said process comprising the steps of:

forming relational equations indicating relationships between:

a speed ratio (i) between said drive and driven pulleys, a number ($N_{IN}$) of rotations of said drive pulley, an input torque ($T_{IN}$) to said drive pulley, an axial thrust ($Q_{DR}$) of said drive pulley, an axial thrust ($Q_{DN}$) of said driven pulley, one of an urging force ($E_1$) between said blocks at an outlet of said drive pulley and an urging force ($E_2$) between said blocks at an inlet of said drive pulley, an axis-axis force (FS) between said drive pulley and said driven pulley, a tension ($T_1$) of said ring at the outlet of said drive pulley, a tension ($T_2$) of said ring at the inlet of said drive pulley, a radial component ($\mu_{RDR}$) of a friction coefficient between said drive pulley and said block of said drive pulley, a tangent compound ($\mu_{TDN}$) of a friction coefficient between said driven pulley and said block of said driven pulley, and a radial component ($\mu_{RDN}$) of the friction coefficient between said driven pulley and said block of said driven pulley;

introducing the radial component ($\mu_{RDR}$) of the friction coefficient between said drive pulley and the block of said drive pulley into the relational equations on the assumption that the radial component of the friction coefficient is a predetermined value;

introducing a vector sum of the tangent component ($\mu_{TDN}$) and the radial component ($\mu_{RDN}$) of the friction coefficient between said driven pulley and said block of said driven pulley into the relational equations on the assumption that the vector sum is a predetermined value;

measuring the speed ratio (i) between said drive pulley and said driven pulley, the number ($N_{IN}$) of rotations of said drive pulley, the input torque ($T_{IN}$) to said drive pulley and the axial thrust ($Q_{DN}$) of said driven pulley to introduce them into the relational equations;

thereby calculating the axial thrust ($Q_{DR}$) of said drive pulley from the relational equations.

2. A process for presuming a power-transmitted state in a metal belt-type continuously variable transmission, said transmission comprising a metal belt having rings and a plurality of blocks supported on said rings, a drive pulley and a driven pulley, wherein said metal belt is reeved around said drive pulley and said driven pulley, and wherein the shift ratio is controlled by changing groove widths of both said drive and driven pulleys by controlling the hydraulic pressure thereon, said process comprising the steps of:

forming relational equations indicating relationships between:

a speed ratio (i) between said drive and driven pulleys, a number ($N_{IN}$) of rotations of said drive pulley, an input torque ($T_{IN}$) to said drive pulley, an axial thrust ($Q_{DR}$) of said drive pulley, an axial thrust ($Q_{DN}$) of said driven pulley, one of an urging force ($E_1$) between said blocks at an outlet of said drive pulley and an urging force ($E_2$) between said blocks a t an inlet of said drive pulley, an axis-axis force (FS) between said drive pulley and said driven pulley, a tension ($T_1$) of said ring at the outlet of said drive pulley, a tension ($T_2$) of said ring at the inlet of said drive pulley, a tangent component ($\mu_{SDR}$) of a friction coefficient between said ring a nd said b lock of said drive pulley, and a tangent component ($\mu_{SDN}$) of a friction coefficient between said ring and said block of said driven pulley;

introducing the tangent component ($\mu_{SDR}$ or $\mu_{SDN}$) of the friction coefficient between said ring and said block of the one of said drive pulley and said driven pulley which has a smaller winding diameter, into the relational equations on the assumption that the tangent component of the friction coefficient is a predetermined value; and measuring the speed ratio (i) between said drive pulley and said driven pulley, the number ($N_{IN}$) of rotations of said drive pulley, the input torque ($T_{IN}$) to said drive pulley and the axial thrust ($Q_{DN}$) of said driven pulley, to place them into the relational equations, thereby calculating the tension ($T_1$) of said ring at the outlet of said drive pulley, the tension ($T_2$) of said ring at the inlet of said drive pulley and one of the urging force ($E_1$) between said blocks at the outlet of said drive pulley and the urging force ($E_2$) between said blocks at the inlet of said drive pulley.

3. A process for presuming a power-transmitted state in a metal belt-type continuously variable transmission, said transmission comprising a metal belt having rings and a plurality of blocks supported on said rings, a drive pulley and a driven pulley, wherein said metal belt is reeved around said drive pulley and said driven pulley, and wherein a shift ratio is controlled by changing groove widths of both said drive and driven pulleys by controlling the hydraulic pressure thereon, said process comprising the steps of:

forming relational equations indicating relationships between:

a speed ratio (i) between said drive and driven pulleys,
a number ($N_{IN}$) of rotations of said drive pulley,
an input torque ($T_{IN}$) to said drive pulley,
an axial thrust ($Q_{DR}$) of said drive pulley,
an axial thrust ($Q_{DN}$) of said driven pulley, one of an urging force ($E_1$) between said blocks at an outlet of said drive pulley and an urging force ($E_2$) between said blocks at an inlet of said drive pulley,
an axis-axis force (FS) between said drive pulley and said driven pulley,
a tension ($T_1$) of said ring at the outlet of said drive pulley,
a tension ($T_2$) of said ring at the inlet of said drive pulley,
a tangent component ($\mu_{TDR}$) of a friction coefficient between said drive pulley and said block of said drive pulley,
a tangent component ($\mu_{TDN}$) of a friction coefficient between said driven pulley and said block of said driven pulley,
a radial component ($\mu_{RDR}$) of the friction coefficient between said drive pulley and said block of said drive pulley,
a radial component ($\mu_{RDN}$) of the friction coefficient between said driven pulley and said block of said driven pulley,
a tangent component ($\mu_{SDR}$) of a friction coefficient between said ring and said block of said drive pulley, and
a tangent component ($\mu_{SDN}$) of a friction coefficient between said ring and said block of said driven pulley;

introducing the tangent component ($\mu_{SDR}$ or $\mu_{SDN}$) of the friction coefficient between said ring and said block of the one of said drive pulley and said driven pulley which has a smaller winding diameter into the relational equations on the assumption that the tangent component of the friction coefficient is a predetermined value; and measuring the speed ratio (i) between said drive pulley and said driven pulley, the number ($N_{IN}$) of rotations of said drive pulley, the input torque ($T_{IN}$) to said drive pulley, the axial thrust ($Q_{DR}$) of said drive pulley, the axial thrust ($Q_{DN}$) of said driven pulley and an axis-axis force (FS) between said drive and driven pulleys to introduce them into the relational equations;

thereby calculating either one of the urging force ($E_1$) between said blocks at the outlet of said drive pulley and the urging force ($E_2$) between the blocks at the inlet of said drive pulley, the tensions ($T_1$ and $T_2$) of said ring at the outlet and the inlet of said drive pulley, the tangent and radial components ($\mu_{TDR}$ and $\mu_{RDR}$) of the friction coefficient between said drive pulley and said block of said drive pulley, the tangent and radial components ($\mu_{TDN}$ and $\mu_{RDN}$) of the friction coefficient between said driven pulley and said block of said driven pulley, and the tangent component ($\mu_{SDR}$ or $\mu_{SDN}$) of the friction coefficient between said ring and said block of the one of said drive pulley and driven pulley which has a larger winding diameter from the relational equations.

4. A process for presuming a power-transmitted state in a metal belt-type continuously variable transmission, said transmission comprising a metal belt having rings and a plurality of blocks supported on said rings, a drive pulley and a driven pulley, wherein said metal belt is reeved around said drive pulley and said driven pulley, and wherein a shift ratio is controlled by changing groove widths of both said drive and driven pulleys by controlling the hydraulic pressure thereon, said process comprising the steps of:

forming relational equations indicating relationships between:

a speed ratio (i) between said drive and driven pulleys,
a number ($N_{IN}$) of rotations of said drive pulley,
an input torque ($T_{IN}$) to said drive pulley,
an axial thrust ($Q_{DR}$) of said drive pulley,
an axial thrust ($Q_{DN}$) of said driven pulley,
one of an urging force ($E_1$) between said blocks at an outlet of said drive pulley and an urging force ($E_2$) between said blocks at an inlet of said drive pulley,
an axis-axis force (FS) between said drive pulley and said driven pulley,
a tension ($T_1$) of said ring at the outlet of said drive pulley,
a tension ($T_2$) of said ring at the inlet of said drive pulley,
a tangent component ($\mu_{TDR}$) of a friction coefficient between said drive pulley and said block of said drive pulley,
a tangent component ($\mu_{TDN}$) of a friction coefficient between said driven pulley and said block of said driven pulley,
a radial component ($\mu_{RDR}$) of the friction coefficient between said drive pulley and said block of said drive pulley,
a radial component ($\mu_{RDN}$) of the friction coefficient between said driven pulley and said block of said driven pulley,
a tangent component ($\mu_{SDR}$) of a friction coefficient between said ring and said block of said drive pulley, and
a tangent component ($\mu_{SDN}$) of a friction coefficient between said ring and said block of said driven pulley;

introducing the radial component ($\mu_{RDR}$) of the friction coefficient between said drive pulley and said block of said drive pulley into the relational equations on the assumption that the radial component of the friction coefficient is a predetermined value;

introducing a vector sum of the tangent and radial components ($\mu_{TDN}$ and $\mu_{RDN}$) of the friction coefficient between said driven pulley and said block of said driven pulley into the relational equations on the assumption that the vector sum is a predetermined value;

introducing the tangent component ($\mu_{SDR}$ or $\mu_{SDN}$) of the friction coefficient between said ring and said block of the one of said drive and driven pulleys which has a smaller winding diameter into the relational equations on the assumption that the tangent component of the friction coefficient is a predetermined value; and measuring the speed ratio (i) between said drive pulley and said driven pulley, the number ($N_{IN}$) of rotations of said drive pulley, the input torque ($T_{IN}$) to said drive pulley and the axial thrust ($Q_{DN}$) of said driven pulley and an axial thrust of said driven pulley and introducing them into the relational equations;

thereby calculating from the relational equations at least one of the axial thrust ($Q_{DR}$) of said drive pulley, one of the urging force ($E_1$) between said blocks at the outlet of said drive pulley and the urging force ($E_2$) between said blocks at the inlet of said drive pulley, the axis-axis force (FS) between said drive and driven pulleys, the tensions ($T_1$ and $T_2$) of said ring at the outlet and the inlet of said drive pulley, the tangent component ($\mu_{TDR}$) of the friction coefficient between said drive pulley and said block of said drive pulley, the tangent and radial component ($\mu_{TDN}$ and $\mu_{RDN}$) of the friction coefficient between said driven pulley and said block of said driven pulley, and the tangent component ($\mu_{SDR}$ or $\mu_{SDN}$) of the friction coefficient between said ring and said block of the one of said drive pulley and driven pulley which has a larger winding diameter.

5. A process for controlling the axial thrust in a metal belt-type continuously variable transmission using the process for presuming the power-transmitted state in the metal belt-type continuous transmission according to claim 3 or 4, said controlling process including the steps of:

calculating a tangent component ($\mu_{TDN}$) and a radial component ($\mu_{RDN}$) of a friction coefficient between a pulley and a block of a driven pulley, and controlling the axial thrust of the driven pulley based on a vector sum of both said components $\mu_{TDN}$ and $\mu_{RDN}$).

* * * * *